(12) United States Patent  
Sul et al.

(10) Patent No.: US 10,814,371 B2  
(45) Date of Patent: Oct. 27, 2020

(54) COOKING APPLIANCE AND METHOD OF MANUFACTURING HOUSING OF COOKING APPLIANCE

(71) Applicant: SAMSUNG ELECTRONICS CO., LTD., Suwon-si, Gyeonggi-do (KR)

(72) Inventors: Nam Ki Sul, Suwon-si (KR); Eun Soo Ko, Suwon-si (KR); Jun Cheol Ki, Gwangju (KR); Ju Seon An, Hwaseong-si (KR); Gyun Lee, Incheon (KR); Shang Hun Lee, Suwon-si (KR); Bo Gyu Jang, Suwon-si (KR); Hun Chul Jung, Seongnam-si (KR); Seung-Hun Ha, Suwon-si (KR); Yong Soo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 15/699,612

(22) Filed: Sep. 8, 2017

(65) Prior Publication Data

US 2018/0071804 A1 Mar. 15, 2018

(30) Foreign Application Priority Data

Sep. 9, 2016 (KR) .................. 10-2016-0116796

(51) Int. Cl.
*B21D 21/00* (2006.01)
*B21D 5/00* (2006.01)
(Continued)

(52) U.S. Cl.
CPC .............. *B21D 5/004* (2013.01); *B21D 11/08* (2013.01); *B21D 21/00* (2013.01); *B23P 15/00* (2013.01); *F24C 15/00* (2013.01); *F24C 15/08* (2013.01)

(58) Field of Classification Search
CPC ....................................................... F24C 15/08
(Continued)

(56) References Cited

U.S. PATENT DOCUMENTS

| 1,651,542 A | * | 12/1927 | Pittman | F24C 15/02 |
| | | | | 126/39 B |
| 1,750,853 A | * | 3/1930 | Morley | F24C 15/08 |
| | | | | 126/1 R |

(Continued)

FOREIGN PATENT DOCUMENTS

| DE | 202 07 060 U1 | 10/2002 |
| JP | 57-20970 A | 12/1982 |

(Continued)

OTHER PUBLICATIONS

International Search Report dated Dec. 27, 2017 in corresponding International Patent Application No. PCT/KR2017/009874, 3 pgs.

(Continued)

*Primary Examiner* — Avinash A Savani  
(74) *Attorney, Agent, or Firm* — Staas & Halsey LLP

(57) ABSTRACT

A cooking appliance includes a housing including a door, a cooking chamber provided inside the housing, and a heater provided to heat the cooking chamber, wherein the housing includes a bending portion, which is bent to have a bending angle and has a bending groove cut using a tool and formed at an inside of the bending portion a first portion, which extends from one end of the bending portion and a second portion, which extends from the other end of the bending portion.

18 Claims, 22 Drawing Sheets

(51) Int. Cl.
  *B21D 11/08*   (2006.01)
  *B23P 15/00*   (2006.01)
  *F24C 15/08*   (2006.01)
  *F24C 15/00*   (2006.01)

(58) Field of Classification Search
  USPC .................................................. 126/1 R, 190
  See application file for complete search history.

(56) References Cited

U.S. PATENT DOCUMENTS

| | | | | |
|---|---|---|---|---|
| 2,078,840 | A * | 4/1937 | Dorl ........................... | F24C 7/06 |
| | | | | 126/19 R |
| 2,235,569 | A * | 3/1941 | Barnes .................... | F24C 15/08 |
| | | | | 219/452.11 |
| 2,914,150 | A * | 11/1959 | McCready .............. | E04F 13/18 |
| | | | | 52/531 |
| 3,318,301 | A | 5/1967 | Schibley | |
| 4,563,559 | A * | 1/1986 | Enami .................. | H05B 6/6426 |
| | | | | 219/738 |
| 8,578,925 | B2 * | 11/2013 | Kelley .................... | F24C 15/04 |
| | | | | 110/173 R |
| 2002/0184936 | A1 | 12/2002 | Gitlin et al. | |
| 2006/0151483 | A1 * | 7/2006 | Yun ......................... | F24C 15/08 |
| | | | | 219/685 |
| 2008/0216625 | A1 * | 9/2008 | Li .......................... | B26D 7/018 |
| | | | | 83/72 |
| 2009/0078244 | A1 * | 3/2009 | Kim ....................... | F24C 15/02 |
| | | | | 126/190 |
| 2011/0083541 | A1 | 4/2011 | Leelaprachakul | |

FOREIGN PATENT DOCUMENTS

| | | |
|---|---|---|
| JP | 60-46819 A | 3/1985 |
| JP | 9-141333 A | 6/1997 |
| JP | 2007-163128 | 6/2007 |
| KR | 1999-018524 | 3/1999 |
| KR | 20-0237253 | 6/2001 |
| KR | 2002-0006804 | 1/2002 |
| KR | 10-2008-0011769 | 2/2008 |
| KR | 20-2010-0004017 | 4/2010 |
| KR | 10-2013-0015763 | 2/2013 |
| KR | 10-2013-0096543 | 8/2013 |
| KR | 10-2016-0027678 | 3/2016 |
| KR | 10-1606437 | 3/2016 |

OTHER PUBLICATIONS

Extended European Search Report dated Jul. 9, 2019 from European Patent Application No. 17849128.8, 9 pages.

\* cited by examiner

COOKING APPLIANCE AND METHOD OF MANUFACTURING HOUSING OF COOKING APPLIANCE

CROSS-REFERENCE TO RELATED APPLICATION

This application claims the benefit of Korean Patent Application No. 10-2016-0116796, filed on Sep. 9, 2016 in the Korean Intellectual Property Office, the disclosure of which is incorporated herein by reference.

BACKGROUND

1. Field

Embodiments of the present disclosure relate to a cooking appliance and a method of manufacturing a housing of the cooking appliance, and more particularly, to a cooking appliance capable of improving a bending process of a housing of the cooking appliance, and a method of manufacturing the housing of the cooking appliance.

2. Description of the Related Art

A cooking appliance is an electric home appliance that cooks food using gas or electricity. Such a cooking appliance may include a housing that forms the exterior, and a cooktop unit disposed at an upper portion of the housing. The cooktop unit may include a heating source such as an induction or gas stove.

A cooking chamber may be disposed inside the housing of the cooking appliance. In this case, the housing may include a door that opens/closes the cooking chamber.

Recently, the housing is manufactured using a panel formed of a steel sheet material according to a consumer's need in a design aspect. When the housing is manufactured using the panel formed of the steel sheet material, the thickness of the panel has to be increased so as to reduce defects that may occur as the panel is bent. As the thickness of the panel is increased, a curvature of a bending portion is increased so that the bending portion is blunt.

SUMMARY

Therefore, it is an aspect of the present disclosure to provide a cooking appliance in which a bending portion of a housing is sharply formed.

It is another aspect of the present disclosure to provide a method of manufacturing a housing of a cooking appliance, whereby a bending portion of the housing is sharply formed.

It is still another aspect of the present disclosure to provide a cooking appliance in which a curve section of a bending portion of a housing is sharply formed.

It is yet still another aspect of the present disclosure to provide a method of manufacturing a housing of a cooking appliance, whereby a curve section of a bending portion of the housing is sharply formed.

Additional aspects of the disclosure will be set forth in part in the description which follows and, in part, will be obvious from the description, or may be learned by practice of the disclosure.

In accordance with one aspect of the present disclosure, a cooking appliance includes: a housing including a door; a cooking chamber provided inside the housing; and a heater provided to heat the cooking chamber, wherein the housing includes: a bending portion, which is bent to have a bending angle and has a bending groove cut using a tool and formed at an inside of the bending portion; a first portion, which extends from one end of the bending portion; and a second portion, which extends from an other end of the bending portion.

The bending groove may extend along the bending portion and may include a curve section.

The bending groove may be formed so that an initial inner angle of the bending groove is about 120° before the bending portion is bent.

The bending angle may include a right angle or an obtuse angle.

The bending groove may have a V-shape.

The bending groove may have an asymmetric shape.

The bending portion may be formed so that a thickness of a thinnest portion of the bending portion satisfies the following equation:

$$3/8 \leq (\text{a thickness of a thinnest portion of the bending portion}/\text{a thickness of the first portion or the second portion}) \leq 1/2.$$

The bending portion may be formed so that a thickness of a thinnest portion of the bending portion is about 0.3 mm or more and about 0.35 mm of less.

The first portion or the second portion may include a curved surface portion.

In accordance with another aspect of the present disclosure, a method of manufacturing a housing of a cooking appliance, includes: fixing a panel to a groove forming device; forming a bending groove that extends from one surface in a bending direction of the panel and has an initial inner angle, wherein the forming of the bending groove includes cutting the panel by rotating a cutting tool; and bending the cut panel by a bending angle along the bending groove so that the bending groove is placed at an inside of the cut panel.

In the forming of the bending groove, the bending groove may be formed to include a curve section.

In the forming of the bending groove, the bending groove may be formed by a computer numerical control (CNC) processing method.

In the forming of the bending groove, the bending groove may be formed so that a cross-section of the bending groove has a V-shape.

In the forming of the bending groove, the bending groove may be formed so that a cross-section of the bending groove has an asymmetric shape.

In the forming of the bending groove, the bending groove may be formed so that an initial inner angle thereof satisfies the following equation:

$$(180° - \text{the bending angle}) \leq \text{an initial inner angle of the bending groove} \leq 150°.$$

In the forming of the bending groove, the bending groove may be formed so that a thickness of a thinnest portion of the bending groove satisfies the following equation:

$$0.25 \leq (\text{a thickness of a thinnest portion of the bending groove}/\text{a thickness of the panel}) \leq 0.5.$$

In the bending of the panel, the bending angle may include a right angle or an obtuse angle.

The method may further include, before the fixing of the panel, forming a gauge hole in the panel.

The fixing of the panel may include fixing the panel in the groove forming device by fixing the gauge hole to a fixing protrusion formed in the groove forming device.

The method may further include, between the forming of the bending groove and the bending of the panel, processing the panel in a form of the housing by a press processing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
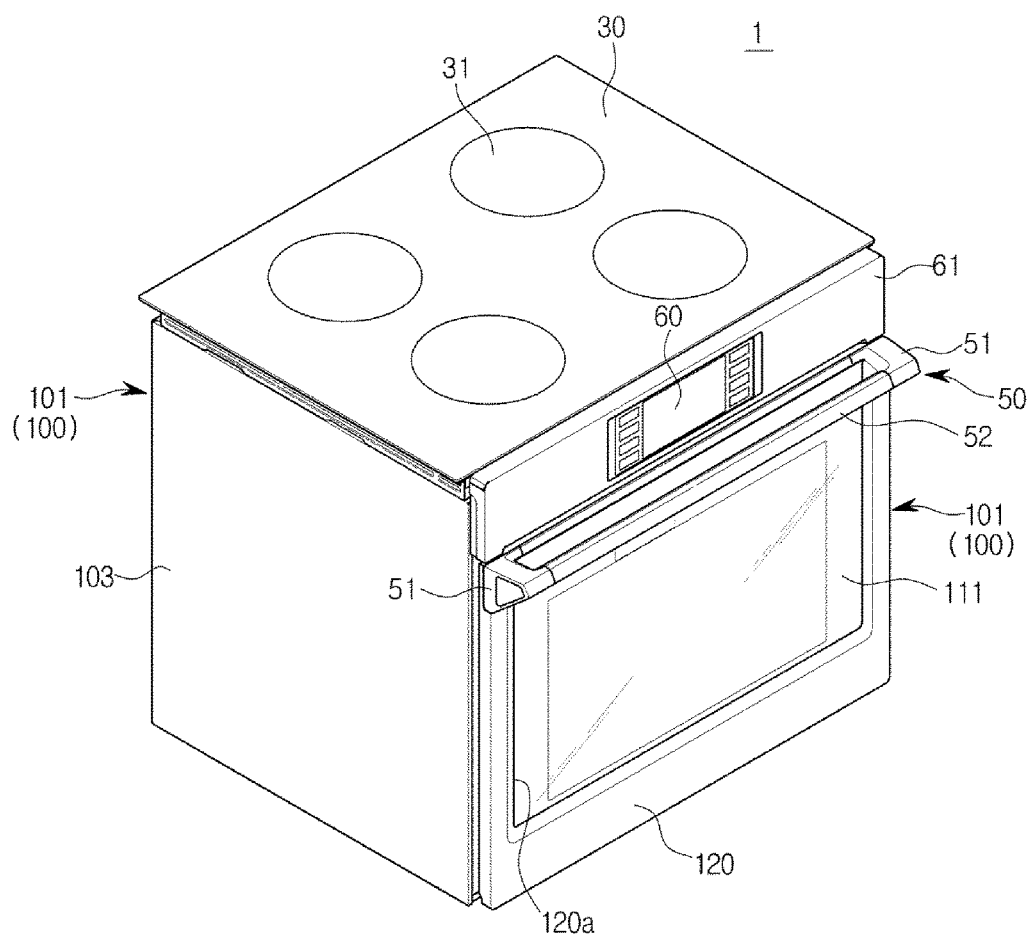
FIG. 1 is a perspective view of the exterior of a cooking appliance according to an embodiment of the present disclosure.

Embodiments described in the present specification and configuration shown in the drawings are just exemplary embodiments of the disclosure, and there may be various modifications that may replace the embodiments of the present specification and the drawings at the time of filing the present application.

Like reference numerals or symbols in each of the drawings of the present specification represent components or elements that perform materially the same functions.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that although the terms including ordinal numbers such as "first", "second", and the like are used herein to describe various elements, these elements should not be limited by these terms. These terms are only used to distinguish one element from another element. Thus, a first element discussed below could be termed a second element, and similarly, a second element may be termed a first element without departing from the teachings of this disclosure. As used herein, the term "and/or" includes any and all combinations of one or more of the associated listed items.

The terms used herein, such as a "front end", a "rear end", an "upper portion", a "lower portion", a "top end", and a "bottom end", are defined based on the drawings, and the shape and position of each element are not limited by the terms.

Hereinafter, embodiments of the present disclosure will be described with reference to the attached drawings in detail.

Figure 2:
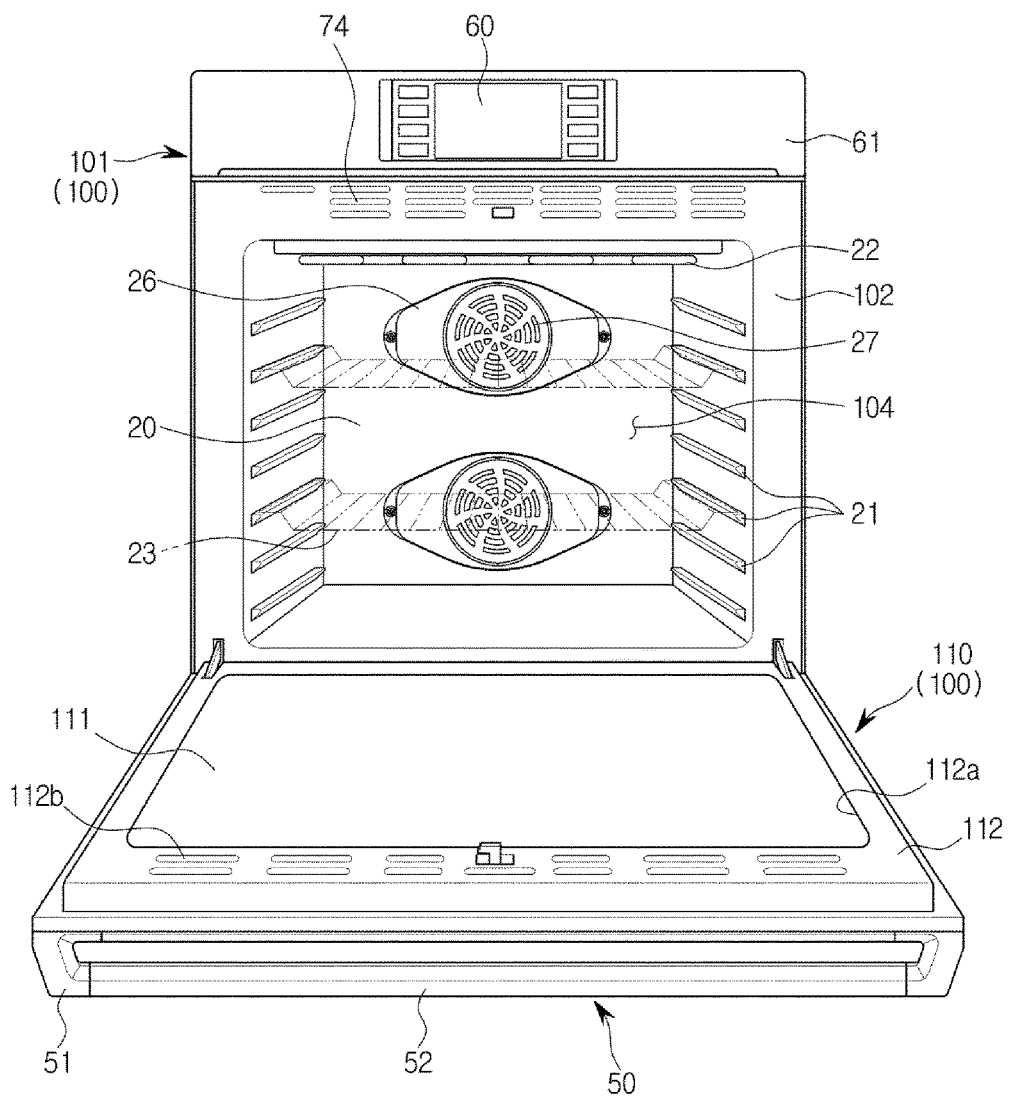
FIG. 2 is a view of a state in which a door of the cooking appliance according to an embodiment of the present disclosure is open.
Figure 3:
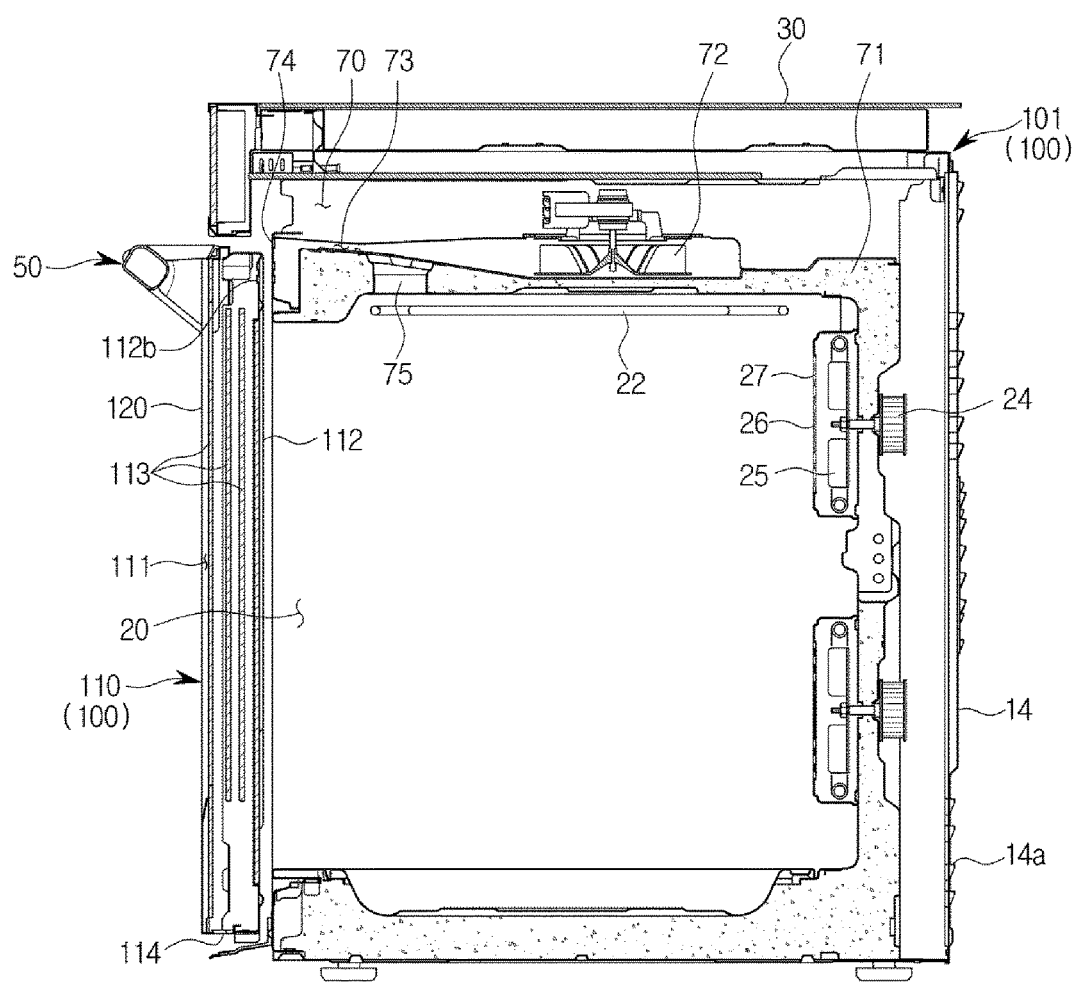
FIG. 3 is a side cross-sectional view of the cooking appliance according to an embodiment of the present disclosure.

FIG. 1 is a perspective view of the exterior of a cooking appliance 1 according to an embodiment of the present disclosure. FIG. 2 is a view of a state in which a door 40 of the cooking appliance 1 according to an embodiment of the present disclosure is open. FIG. 3 is a side cross-sectional view of the cooking appliance 1 according to an embodiment of the present disclosure.

The cooking appliance 1 according to an embodiment of the present disclosure will be described with reference to FIGS. 1 through 3.

The cooking appliance 1 may include a housing 100 that constitutes the exterior, a cooking chamber 20 placed at an inside of the housing 100, and a cooktop 30, which is disposed at a top end of the cooking appliance 1 and on which a container with an object to be cooked may be put and heated.

At least one heating region 31 may be provided in the cooktop 30. The container with the object to be cooked is placed within the heating region 31 and may be directly heated. A heating source formed by winding a coil a plurality of times may be provided in the heating region 31 and may heat the container with the object to be cooked. However, the heating source may be not a heating coil that is a heating body using electricity but a gas burner or an oil burner. That is, the cooking appliance 1 according to the embodiment of the present disclosure may include an induction, a heating coil, a gas burner, and an oil burner as the heating source.

The housing 100 may include a main body 101 and a door 110. The main body 101 may include a front panel 102 that forms a front surface of the main body 101, a side panel 103 that forms sides of the main body 101, and a rear panel 14 that forms a rear surface of the main body 101.

The cooking chamber 20 may be provided to have a box shape at an inside of the main body 101, and the front of the cooking chamber 20 may be open so that the object to be cooked may be put in or taken out from the cooking chamber 20. An opening 104 may be provided in the front panel 102 to correspond to the cooking chamber 20 having the open front. The open front of the cooking chamber 20 may be open/closed by the door 110.

A plurality of supports 21 may be provided inside the cooking chamber 20. A rack 23 on which the object to be cooked may be put, may be mounted on the plurality of supports 21. The plurality of supports 21 may protrude from left and right sidewalls of the cooking chamber 20.

A divider (not shown) may be detachably mounted on the plurality of supports 21 and may divide the cooking chamber 20. In detail, the divider may be horizontally mounted on the cooking chamber 20 and may divide the cooking chamber 20 into a plurality of parts.

Sizes of the plurality of cooking chambers 20 need not be the same but may be different from one another. The divider is formed of an insulating material and may insulate each of the cooking chambers 20. Thus, a user may utilize a space of the cooking chamber 20 according to the user's intention.

A heater 22 may be provided in the cooking chamber 20 so as to heat the object to be cooked. In the current embodiment, the heater 22 may be an electric heater including an electrical resistor. However, unlike in the current embodiment, the heater 22 may be a gas heater that generates heat by combusting gas. That is, the cooking appliance 1 according to an embodiment of the present disclosure may include an electric oven and a gas oven as a heating source.

A circulation fan 25 that circulates air in the cooking chamber 20 so that the object to be cooked can be uniformly heated, and a circulation motor 24 that drives the circulation fan 25 may be provided in the rear of the cooking chamber 20. A fan cover 26 that covers the circulation fan 25 may be disposed in front of the circulation fan 25, and a through hole 27 through which air may flow, may be formed in the fan cover 26.

The door 110 may be hinge-coupled to the front panel 102 of the main body 101 so as to be rotated with respect to the main body 101. Unlike this, although not shown, the door 110 may also be hinge-coupled to the left or right of the main body 101.

The door 110 may include a see-through portion 111 formed of a transparent material such as glass, so that the user can check a cooking procedure of the object to be cooked inside the cooking chamber 20 from the outside through the see-through portion 111. The door 110 may include a front door frame 120 and a rear door frame 112, which are disposed along edges of the see-through portion 111. The front door frame 120 may include a front frame opening 120a for forming the see-through portion 111, and the rear door frame 112 may include a rear frame opening 112a.

A plurality of glass members 113 may be disposed inside the door 110. This is to see the inside of the cooking chamber 20 through the see-through portion 111, and the see-through portion 111 may be formed of a transparent member other than the plurality of glass members 113.

A door suction port 114 through which the air may be suctioned to the inside of the door 110 may be disposed at a bottom end of the door 110. The outdoor air introduced from the bottom end of the door 110 may be moved to the upper side of the door 110, may be exchanged with heat transferred from the cooking chamber 20 and then may be discharged through a door discharge port 112b disposed in the rear door frame 112 disposed in the rear of the door 110. Through this configuration, according to the present disclosure, heat inside the door 110 may be cooled through circulation of the air.

A handle 50 that the user grasps may be disposed at a top end of a front surface of the door 110 so as to easily open/close the door 110. On the other hand, when the door 110 is hinge-coupled to the left or right of the main body 101, in response, the handle 50 may also be provided at the right or left of the front surface of the door 110.

The handle 50 may protrude from the front surface of the door 110 forward by a predetermined length. That is, the handle 50 may include a pair of handle supports 51 that extend from the front surface of the door 110 forward, and a handle extension portion 52 that connects the pair of handle supports 51 to each other.

A display module 60 may be disposed at an upper portion of a front surface of the front panel 102 so that various operation information of the cooking appliance 1 can be displayed and the user can input operation instructions through the display module. The display module 60 may be mounted on a machine room cover 61.

The machine room cover 61 may be disposed at at least a part of the main body 101. According to an embodiment of the present disclosure, the machine room cover 61 may be disposed at one side of the front surface of the main body 101. However, embodiments of the present disclosure are not limited thereto, and the machine room cover 61 may be disposed at a top surface of the main body 101 or may form one surface of the main body 101.

The cooking appliance 1 may have a machine room 70 that accommodates electronic units for controlling operations of various components including the display module 60. The machine room 70 may be provided at an upper portion of the cooking chamber 20. An insulating material 71 may be disposed between the machine room 70 and the cooking chamber 20 so as to prevent heat of the cooking chamber 20 from being transferred to the machine room 70 and may insulate the machine room 70 and the cooking chamber 20.

The insulating material 71 may be provided to entirely cover the outside of the cooking chamber 20 so that heat of the cooking chamber 20 is not transferred to the outside of the cooking appliance 1, as well as the insulating material 71 used to insulate the machine room 70 and the cooking chamber 20.

The cooking appliance 1 may have a cooling structure in which air is circulated around the cooking chamber 20 so as to cool the machine room 70. The cooling structure of the cooking appliance 1 may include a cooling fan unit 72 that moves air, and a cooling flow path 73 through which air suctioned by the cooling fan unit 72 is discharged in a forward direction of the cooking appliance 1.

That is, air outside the main body 101 may be suctioned into the machine room 70 through a through hole 14a formed in the rear panel 14, and the air suctioned into the machine room 70 may flow inside the machine room 70, may cool the electronic units and then may be finally discharged in the forward direction of the cooking appliance 1 through a discharge port 74 along the cooling flow path 73.

A portion of the air of the cooking chamber 20 may be suctioned toward the cooling flow path 73 via an exhaust flow path 75 and may be discharged in the forward direction of the cooking appliance 1.

Figure 4:
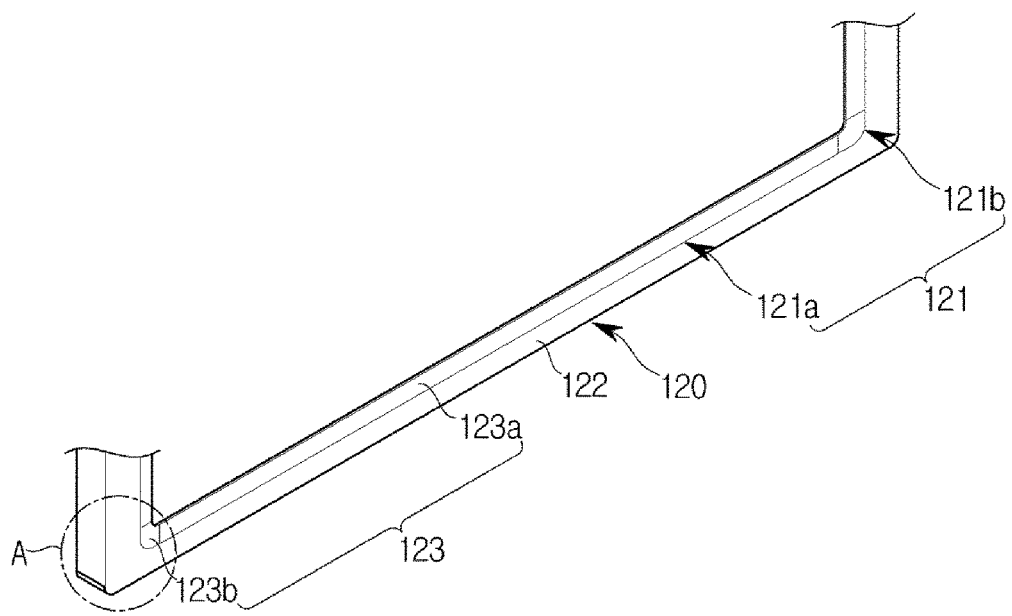
FIG. 4 is a perspective view of a portion of a door of a housing illustrated in FIG. 1.
Figure 5:
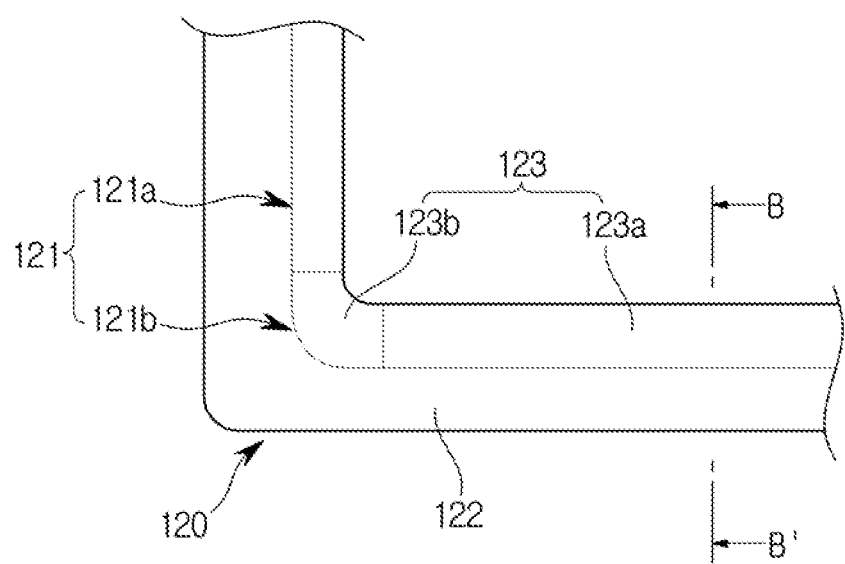
FIG. 5 is a plan view of a portion A indicated in FIG. 4.
Figure 6:
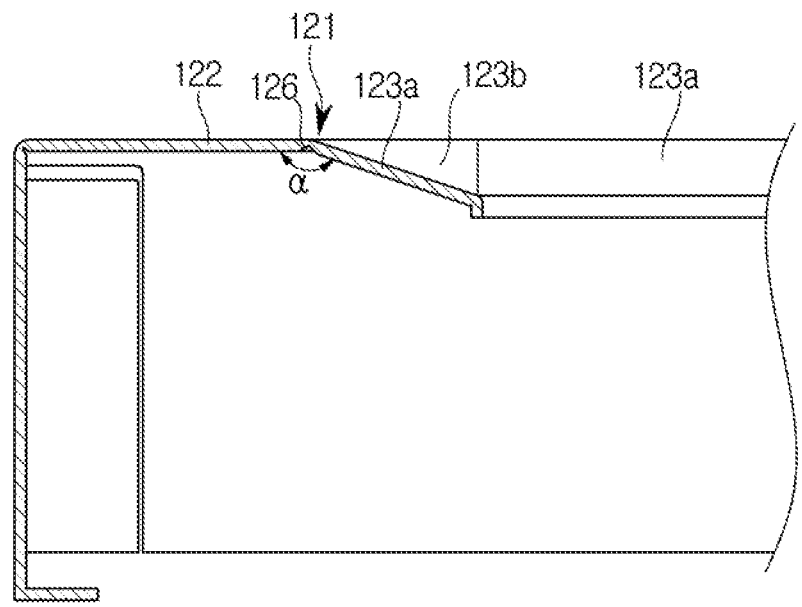
FIG. 6 is a cross-sectional view of a portion B-B' indicated in FIG. 5.
Figure 7:
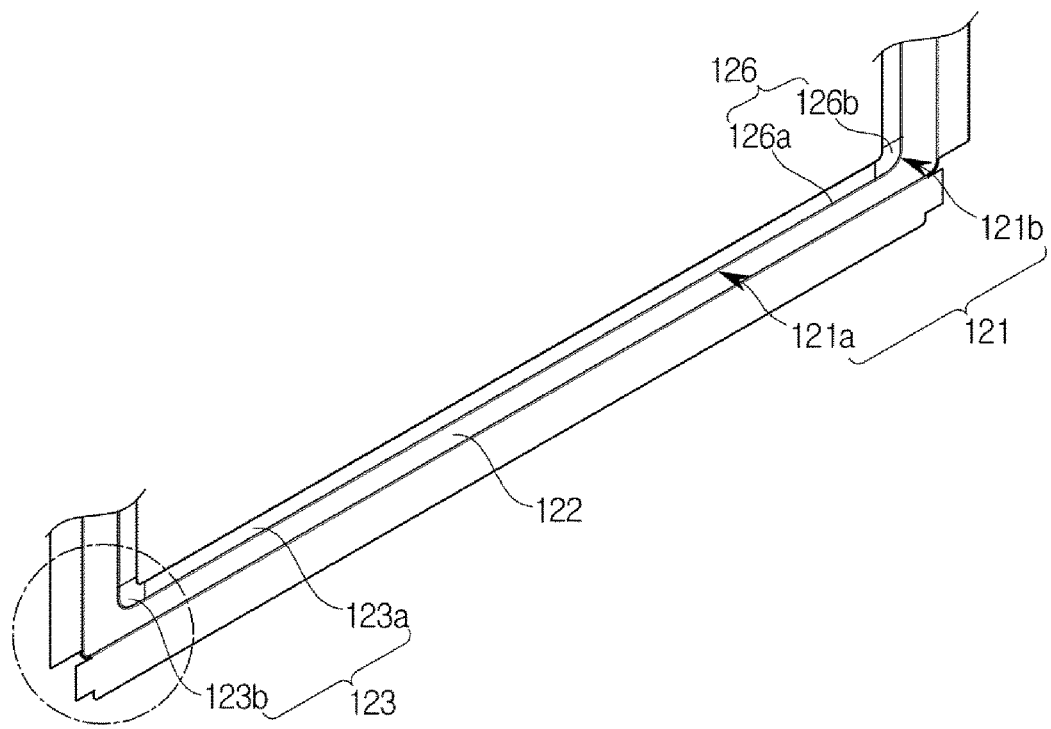
FIG. 7 is a perspective view of a state before a portion of the door of the housing illustrated in FIG. 4 is bent.
Figure 8:
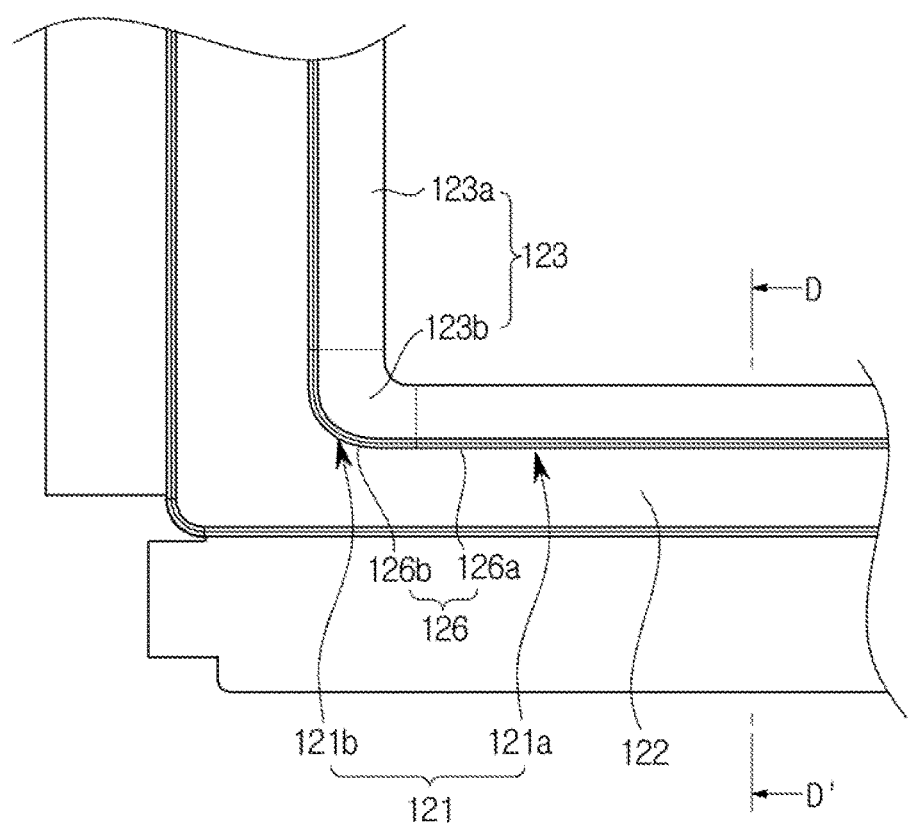
FIG. 8 is a view of a portion C indicated in FIG. 7.
Figure 9:
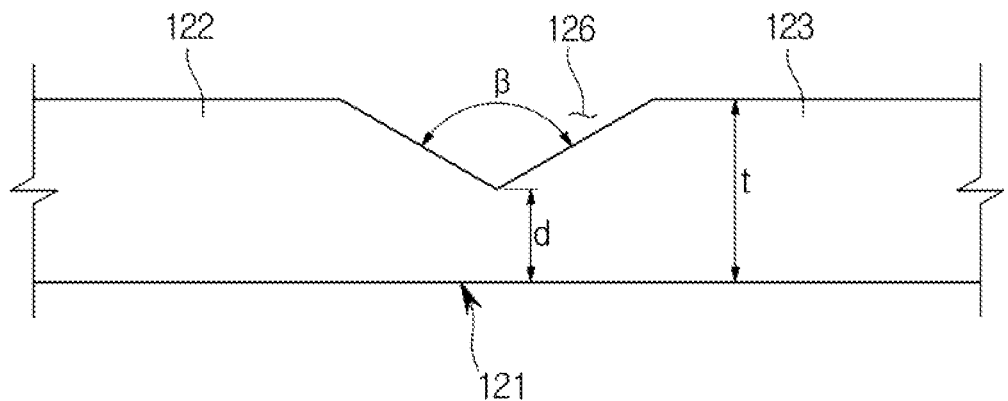
FIG. 9 is a cross-sectional view of a portion D-D' indicated in FIG. 8.
Figure 10:
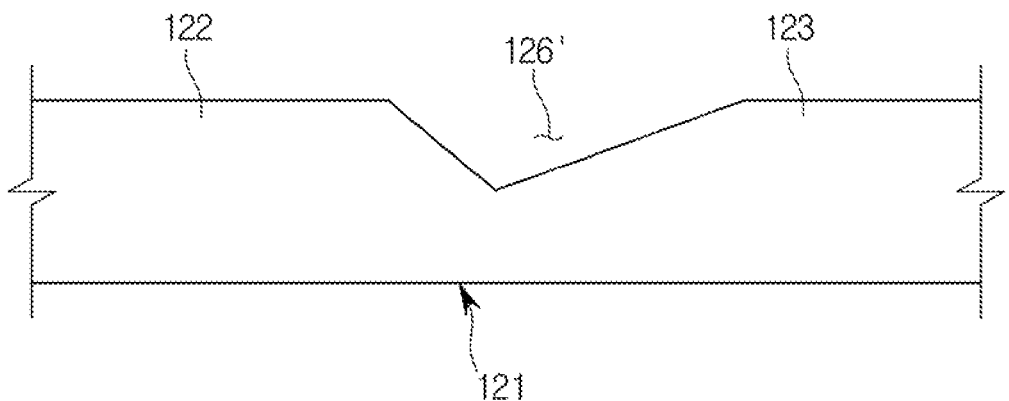
FIG. 10 is a view of a modified embodiment of a bending groove illustrated in FIG. 9.

FIG. 4 is a perspective view of a portion of the door 110 of the housing 100 illustrated in FIG. 1. FIG. 5 is a plan view of a portion A indicated in FIG. 4. FIG. 6 is a cross-sectional view of a portion B-B' indicated in FIG. 5. FIG. 7 is a perspective view of a state before a portion of the door 110 of the housing 100 illustrated in FIG. 4 is bent. FIG. 8 is a view of a portion C indicated in FIG. 7. FIG. 9 is a cross-sectional view of a portion D-D' indicated in FIG. 8. FIG. 10 is a view of a modified embodiment of a bending groove 126 illustrated in FIG. 9.

The front door frame 120 of the door 110 of the housing 100 may include a bending portion 121 that is bent so that an inner angle of the bending portion 121 has a bending angle α, a first portion 122 that extends from one end of the bending portion 121, and a second portion 123 that extends from the other end of the bending portion 121.

The bending portion 121 may be bent in a state in which the bending groove 126 is formed in an inside of the bending portion 121. Since the bending portion 121 is bent in the state in which the bending groove 126 is formed in the inside of the bending portion 121, edges may be sharply formed at an outside of the bending portion 121. Referring to FIG. 6, the bending portion 121 may be formed so that the bending angle α of the bending portion 121 is a right angle or an obtuse angle.

The bending portion 121 may include a linear bending portion 121a that is bent in an approximately linear shape, and a curved bending portion 121b that is bent in a curve shape with a predetermined curvature. However, the shape of the curved bending portion 121b is not limited thereto and may be formed to have various curve shapes such as an irregular curve with a varying curvature, a streamlined curve, and a parabola.

The bending groove 126 extends along the bending portion 121, and before the bending portion 121 is bent, the cross-section of the bending groove 126 may have an approximately V-shape, as illustrated in FIG. 9. However, the shape of the cross-section of the bending groove 126 is not limited thereto, and the cross-section of the bending groove 126 may have an approximately U-shape. Furthermore, the bending portion 121 may also have an asymmetric bending groove 126', as illustrated in FIG. 10.

The bending groove 126 may include a first groove portion 126a and a second groove portion 126b.

The first groove portion 126a may be formed to have an approximately linear shape. Thus, the first groove portion 126a may be a linear groove portion 126a. The first groove portion 126a may be formed to correspond to the linear bending portion 121a of the bending portion 121.

The second groove portion 126b may be formed to have a curve shape. Thus, the second groove portion 126b may be a curved groove portion 126b. The second groove portion 126b may be formed to have a curve shape having a predetermined curvature. However, the shape of the second groove portion 126b is not limited thereto, and the second groove portion 126b may have various curve shapes such as an irregular curve having a varying curvature, a streamlined shape, and a parabola. The second groove portion 126b may be formed to correspond to the curved bending portion 121b of the bending portion 121.

The bending groove 126 may be formed to have an initial inner angle $\beta$ before the bending portion 121 is bent. The bending groove 126 may be formed so that the initial inner angle $\beta$ satisfies the following equation:

(180°—the bending angle $\alpha$)≤the initial inner angle $\beta$ of the bending groove 126≤150°.

The bending groove 126 may be formed so that the initial inner angle $\beta$ is approximately 120°. The bending groove 126 may be formed so that a space thereof remains in the bending groove 126 even after the bending portion 121 is bent. Unlike this, although not shown, the bending groove 126 may be formed so that inner sides thereof may be in contact with each other and thus there is no remaining space after the bending portion 121 is bent.

The bending portion 121 may be formed so that a thickness d of a thinnest portion of portions in which the bending groove 126 is formed, satisfies the following equation:

⅜≤(the thickness $d$ of the thinnest portion of the bending portion 121/the thickness $t$ of the first portion 122 or the second portion 123)≤½.

That is, when a thickness t (i.e., the thickness of the front door frame 120) of the first portion 122 and/or the second portion 123 that will be described later is approximately 0.8 mm, a thickness d of the thinnest portion of the bending portion 121 may be formed to be equal to or greater than approximately 0.3 mm and to be equal to or less than approximately 0.4 mm. The thickness d of the thinnest portion of the bending portion 121 may be formed to be equal to or greater than approximately 0.3 mm and to be equal to or less than approximately 0.35 mm regardless of the thickness t of the front door frame 120. As the thickness d of the thinnest portion of the bending portion 121 is in the above-described range, crack or break may be prevented from occurring during bending.

The first portion 122 may extend from one end of the bending portion 121 in an approximately horizontal direction. The first portion 122 may constitute a front surface of the front door frame 120.

The second portion 123 may extend from the other end of the bending portion 121 in an inclined direction with respect to the first portion 122 by the bending angle $\alpha$. The second portion 123 may be formed to be inclined toward the cooking chamber 20. The second portion 123 may include a planar portion 123a having an approximately planar shape and a curved surface portion 123b having a curved surface shape.

The planar portion 123a may be provided to correspond to the linear bending portion 121a of the bending portion 121. That is, the planar portion 123a may extend from the other end of the linear bending portion 121a of the bending portion 121.

The curved surface portion 123b may be provided to correspond to the curved bending portion 121b of the bending portion 121. That is, the curved surface portion 123b may extend from the other end of the curved bending portion 121b of the bending portion 121.

In the cooking appliance 1 having the above-described configuration according to the present disclosure, the bending groove 126 is formed in the bending portion 121 of the housing 100 and then bending is performed so that the bending portion 121 can be sharply formed. In the current embodiment, only the bending portion 121 of the front door frame 120 of the door 110 of the housing 100 has been described. However, the structure of the bending portion 121 may be applied to another bending portion of the housing 100 of the cooking appliance 1.

Furthermore, the bending portion 121 of the housing 100 having the above-described configuration according to the present disclosure is not limited to the cooking appliance 1 and may be applied to a home appliance such as a refrigerator, a washing machine or an air conditioner.

FIGS. 11 through 21 are views illustrating a process of manufacturing the housing 100 of the cooking appliance 1 in an order according to an embodiment of the present disclosure. FIG. 22 is a flowchart illustrating a process of manufacturing the housing 100 of the cooking appliance 1 according to an embodiment of the present disclosure.

A method of manufacturing the housing 100 of the cooking appliance 1 according to an embodiment of the present disclosure will be described with reference to FIGS. 11 through 22.

Figure 11:
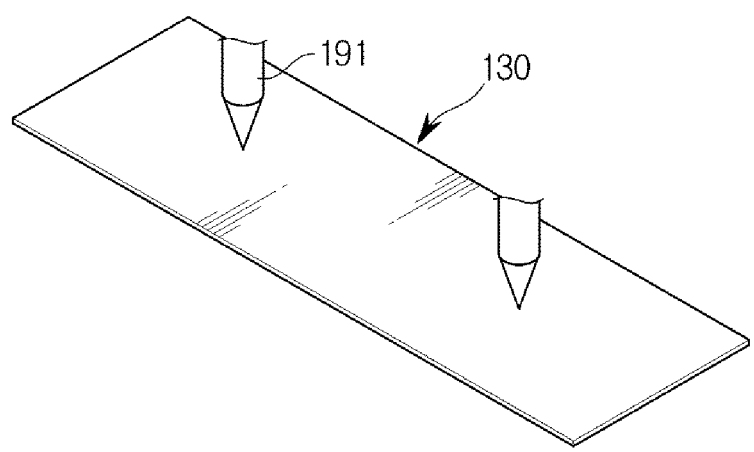
FIGS. 11, 12, 13, 14, 15, 16, 17, 18, 19, 20 and 21 are views illustrating a process of manufacturing a housing of a cooking appliance in an order according to an embodiment of the present disclosure.

First, referring to FIG. 11, Operation S10 of preparing a panel 130 for manufacturing the front door frame 120 of the housing 100 may be performed. The panel 130 may include a steel material.

Next, Operation S20 of forming a gauge hole 131 in the panel 130 may be performed. At least two gauge holes 131 may be formed. The gauge hole 131 may be formed using a drill 191. However, a method of forming the gauge hole 131 is not limited thereto, and the gauge hole 131 may also be formed using a sharp tool.

Figure 12:
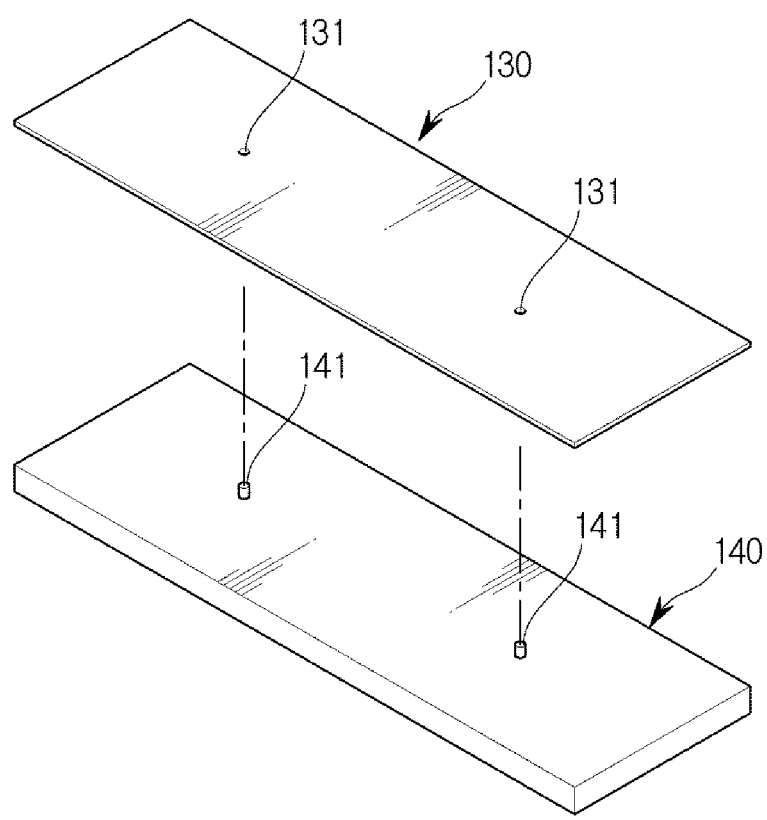

Next, referring to FIG. 12, Operation S30 of fixing the panel 130 having the gauge hole 131 formed therein, to a groove forming device 140 may be performed. In detail, the gauge hole 131 may be inserted into a fixing protrusion 141 formed in the groove forming device 140. Thus, the panel 130 may be fixed to the groove forming device 140.

Figure 13:
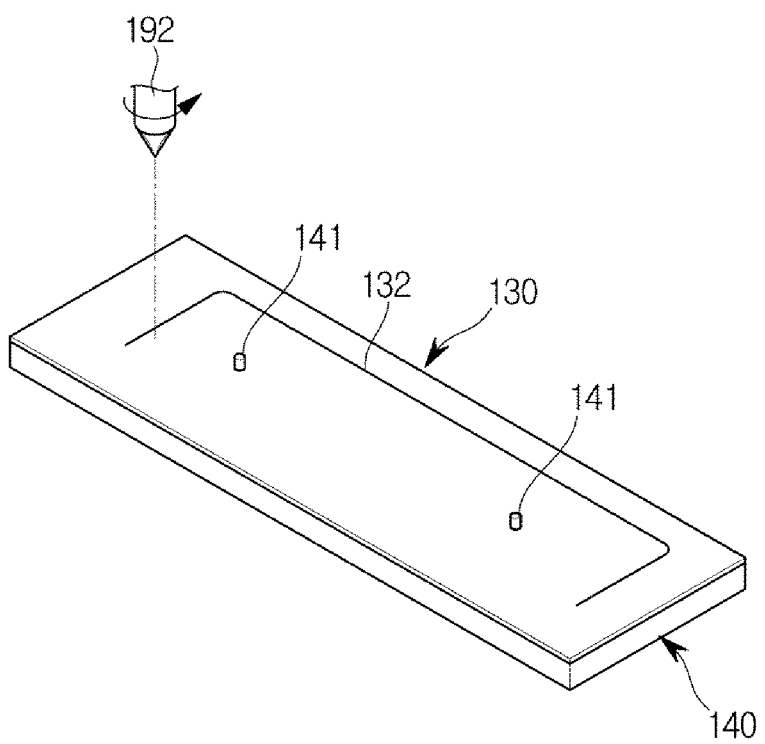

Next, referring to FIG. 13, Operation S40 of forming a bending groove 132 in the panel 130 may be performed. In detail, the bending groove 132 may be formed as a cutting tool 192 is rotated and thus, the panel 130 is cut. In this case, the bending groove 132 may be formed to have the initial inner angle β. Also, the bending groove 132 may be formed to include a curve section having a predetermined curvature. Furthermore, the bending groove 132 may be formed by a computer numerical control (CNC) processing method.

The bending groove 132 may be formed so that the cross-section thereof has a V-shape. On the other hand, the bending groove 132 may be formed so that the cross-section thereof has an asymmetric shape.

Furthermore, the bending groove 132 may be formed so that the initial inner angle β thereof satisfies the following equation:

(180°—the bending angle α)≤the initial inner angle β of the bending groove 132≤150°.

To this end, the above-described cutting tool 192 may be provided so that a front end of the cutting tool 192 has an angle corresponding to the initial inner angle β of the bending groove 132. Furthermore, the initial inner angle β of the bending groove 132 may be 120°, and in response, an angle of the front end of the cutting tool 192 may also be 120°.

Furthermore, the bending groove 132 may be formed so that the thickness of a thinnest portion of the bending groove 132 satisfies the following equation:

0.25≤(a thickness of the thinnest portion of the bending groove 132/a thickness of the panel 130)≤0.5.

Hereinafter, a portion in which the bending groove 132 is formed, is referred to as a bending portion 133.

Next, Operation S50 of detaching the panel 130 from the groove forming device 140 may be performed.

Figure 14:
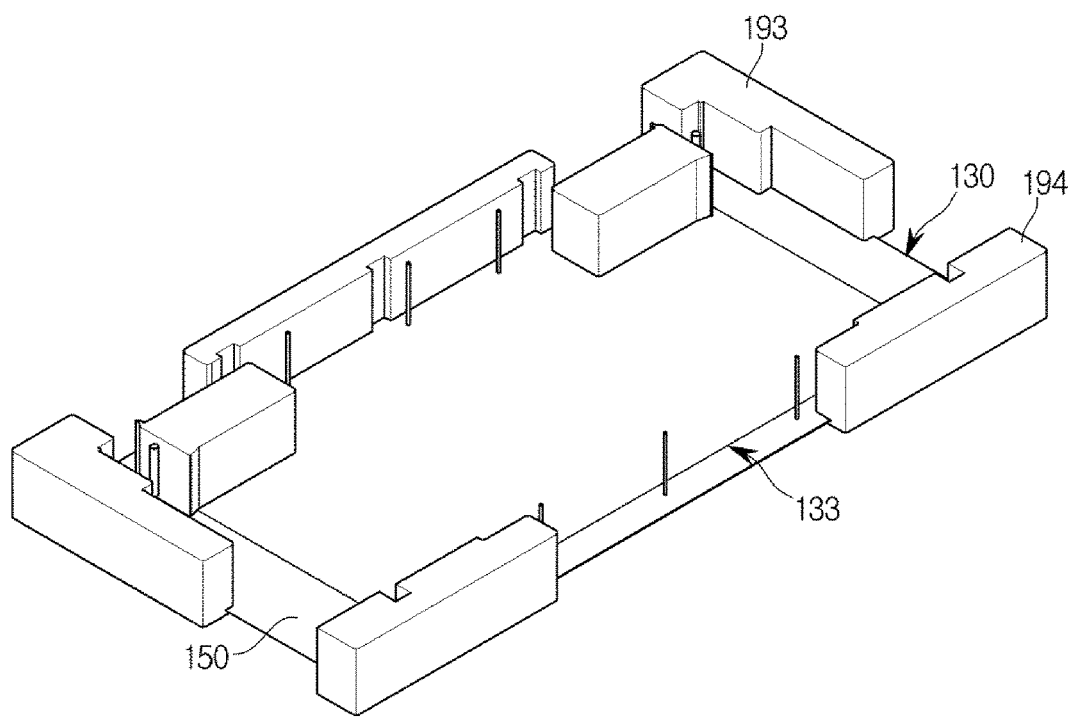
Figure 15:
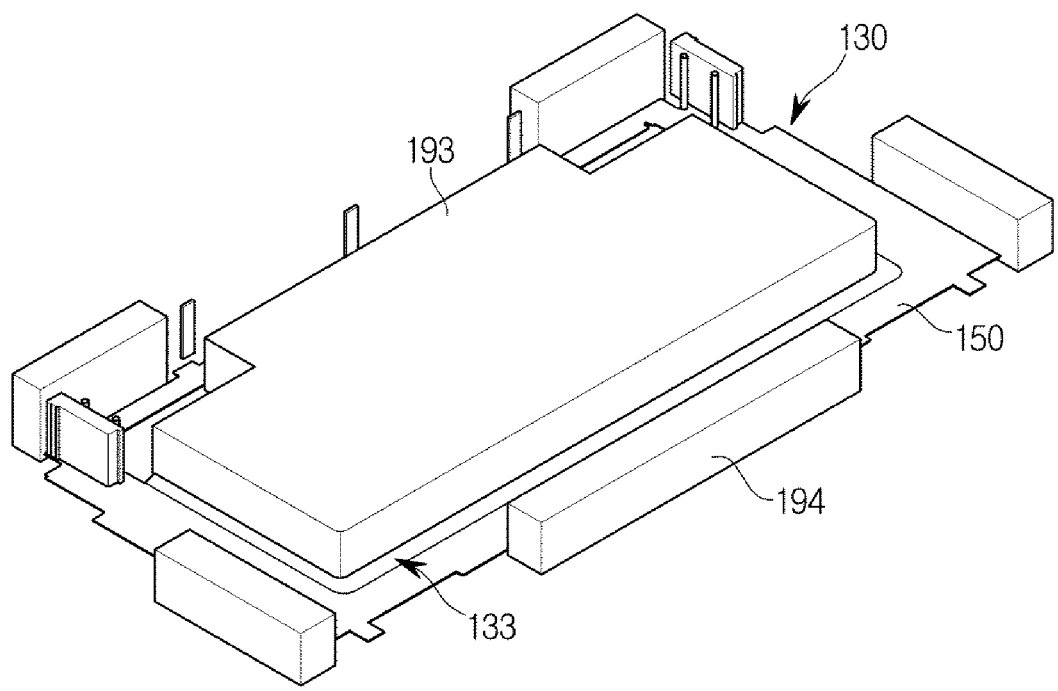

Next, referring to FIGS. 14 and 15, Operation S60 of processing the panel 130 in the form of the housing 100 may be performed. In detail, the panel 130 may be processed in the form of the housing 100 as the panel 130 is pressurized by a piercing punch 193 and/or a notching punch 194. Operation S60 of processing the panel 130 in the form of the housing 100 is not limited to the shape illustrated in FIGS. 14 and 15, and a required shape of the housing 100 may be formed using the piercing punch 193 and/or the notching punch 194 having various shapes.

Next, referring to FIGS. 16 through 21, Operation S70 of bending the panel 130 may be performed. In detail, Operation S70 of bending the panel 130 may include an operation of bending the panel 130 by a bending angle α along the bending groove 132 so that the bending groove 132 is placed at an inside of the panel 130. Hereinafter, the bending process may be performed when the panel 130 is pressurized on a pre-manufactured mold (not shown). Hereinafter, such a processing method is referred to as a press processing.

Figure 16:
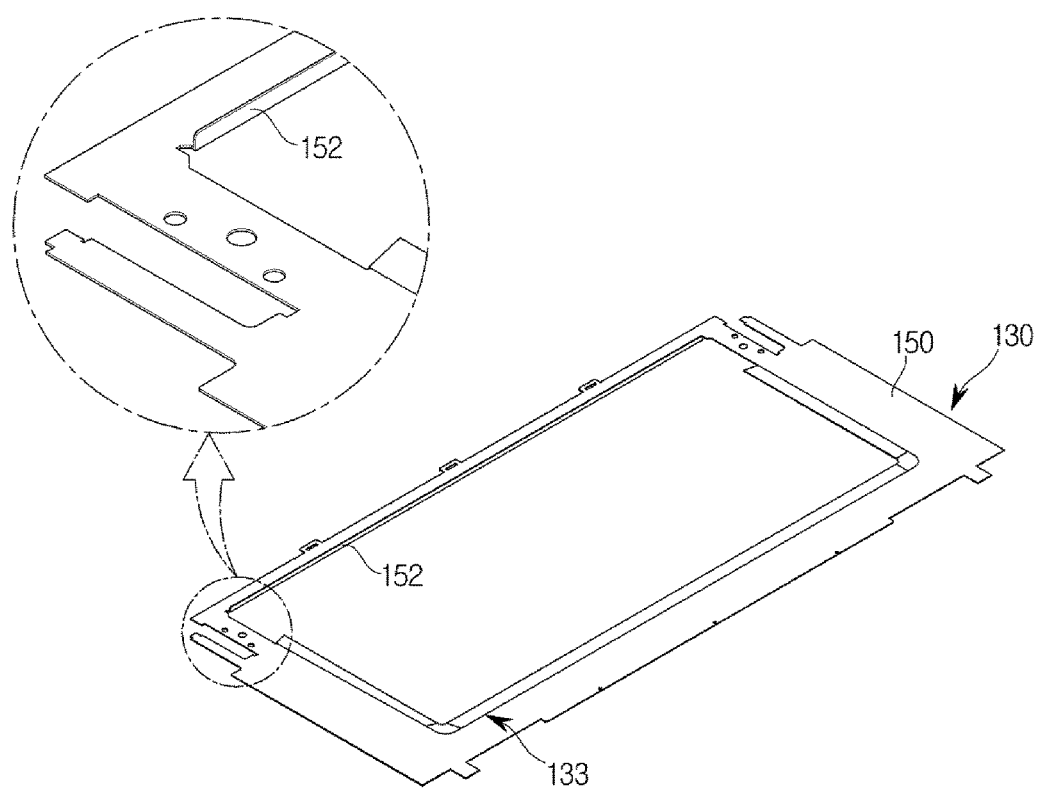

Referring to FIG. 16, first, a first bending portion 152 of the panel 130 may be bent with respect to a first portion 150 of the panel 130 so as to face one side. In detail, the first bending portion 152 may be bent to have an angle of approximately 90° with respect to the first portion 150.

Figure 17:
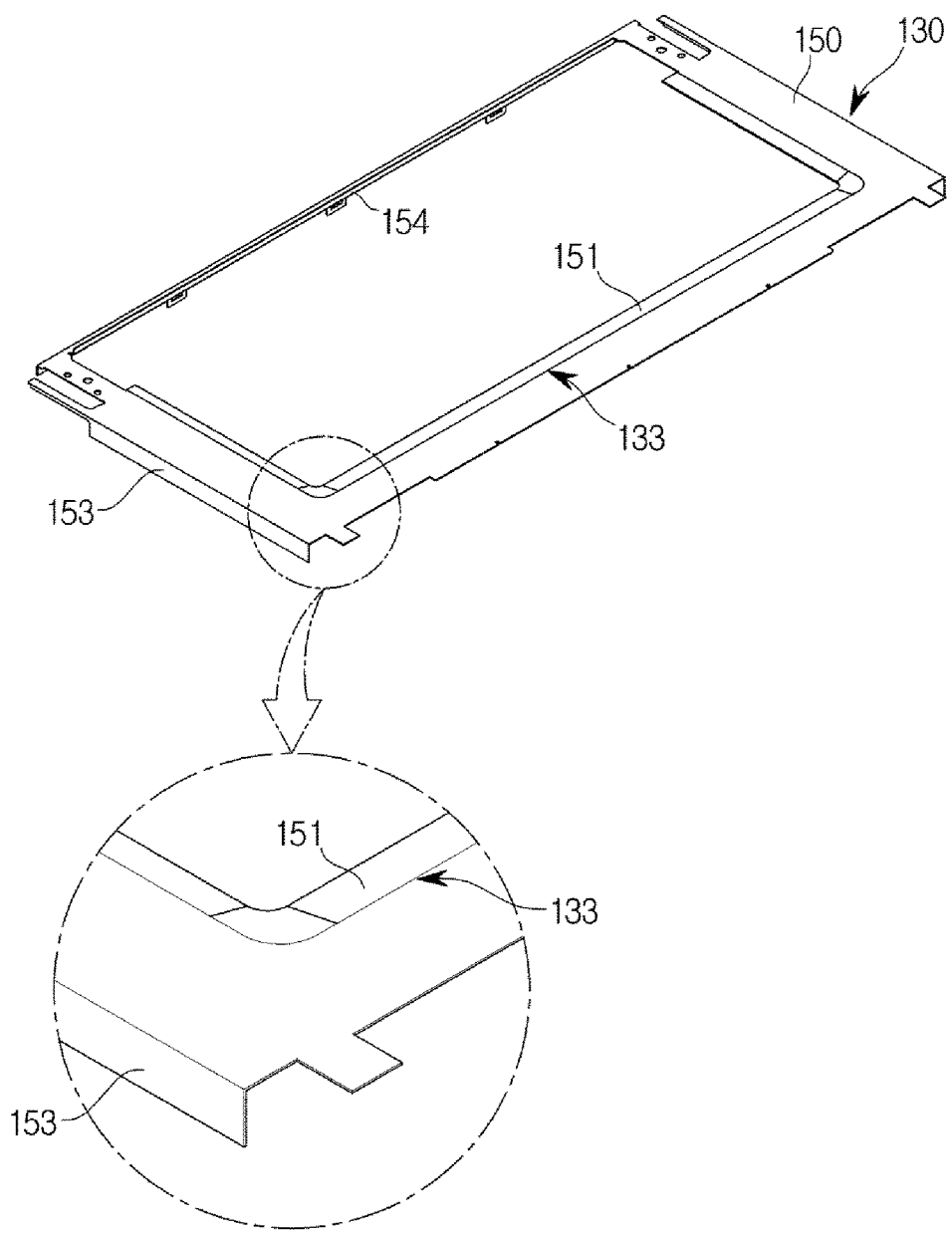

Next, referring to FIG. 17, a second portion 151 of the panel 130 may be bent with respect to the first portion 150 so as to face the other side opposite to one side. In this case, the second portion 151 may be bent by the bending angle α along the bending groove 132. In this case, the mold (not shown) may include a portion bent by the bending angle α. The bending angle α may include a right angle or an obtuse angle.

Also, a second bending portion 153 of the panel 130 may be bent with respect to the first portion 150 so as to face the other side. In detail, the second bending portion 153 may be bent to have an angle of approximately 90° with respect to the first portion 150. The second bending portion 153 may be bent in an opposite direction to a direction of the first bending portion 152. The second bending portion 153 may extend in a direction approximately perpendicular to the first bending portion 152.

Also, a third bending portion 154 of the panel 130 may be bent with respect to the first portion 150 so as to face the other side. In detail, the third bending portion 154 may be bent to have an angle of approximately 90° with respect to the first portion 150.

Figure 18:
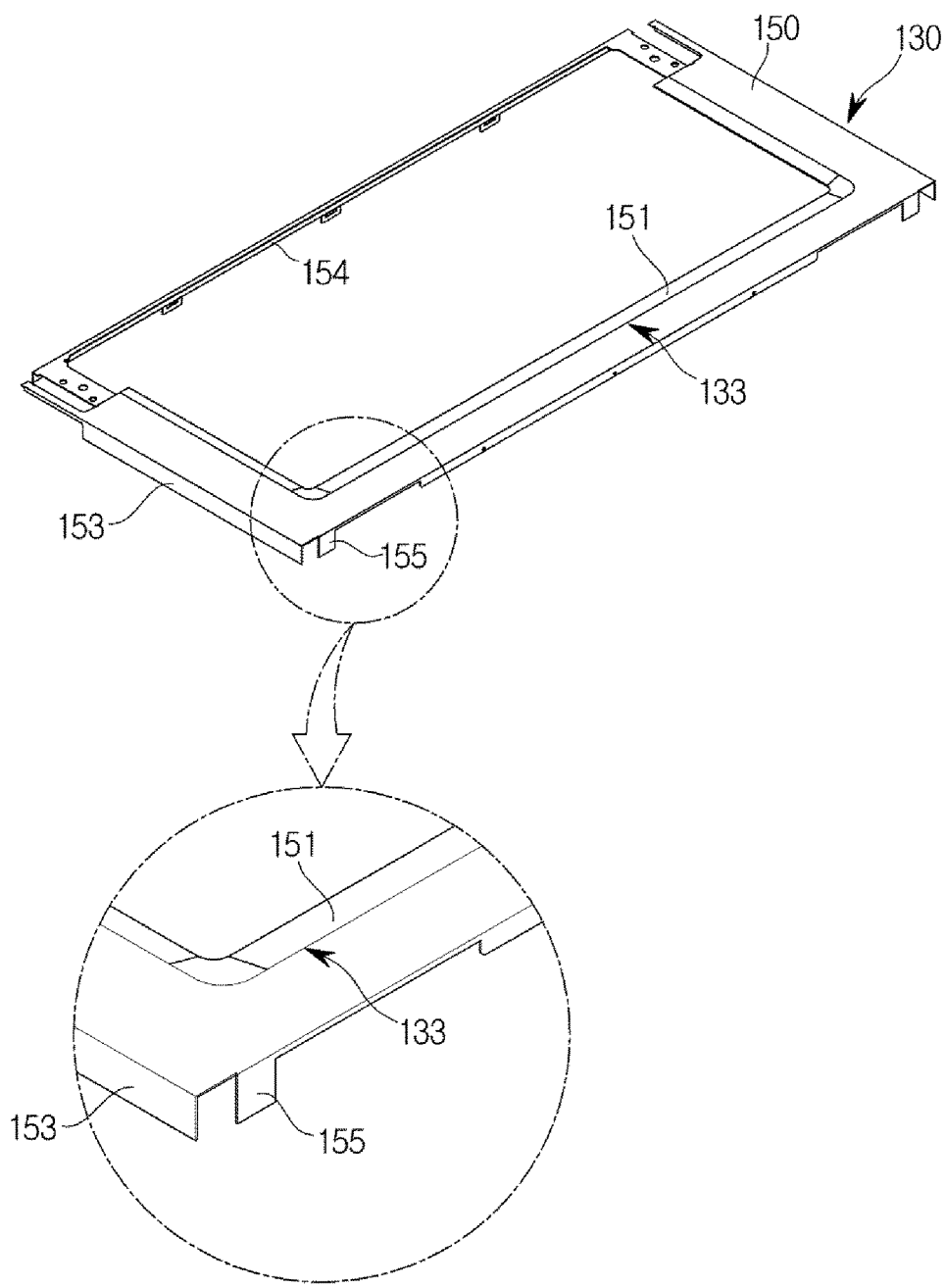

Next, referring to FIG. 18, a fourth bending portion 155 of the panel 130 may be bent with respect to the first portion 150 so as to face the other side. In detail, the fourth bending portion 155 may be bent to have an angle of approximately 90° with respect to the first portion 150. The fourth bending portion 155 may be bent in the same direction as that of the second bending portion 153. The fourth bending portion 155 may extend in a direction approximately parallel to the first bending portion 152.

Figure 19:
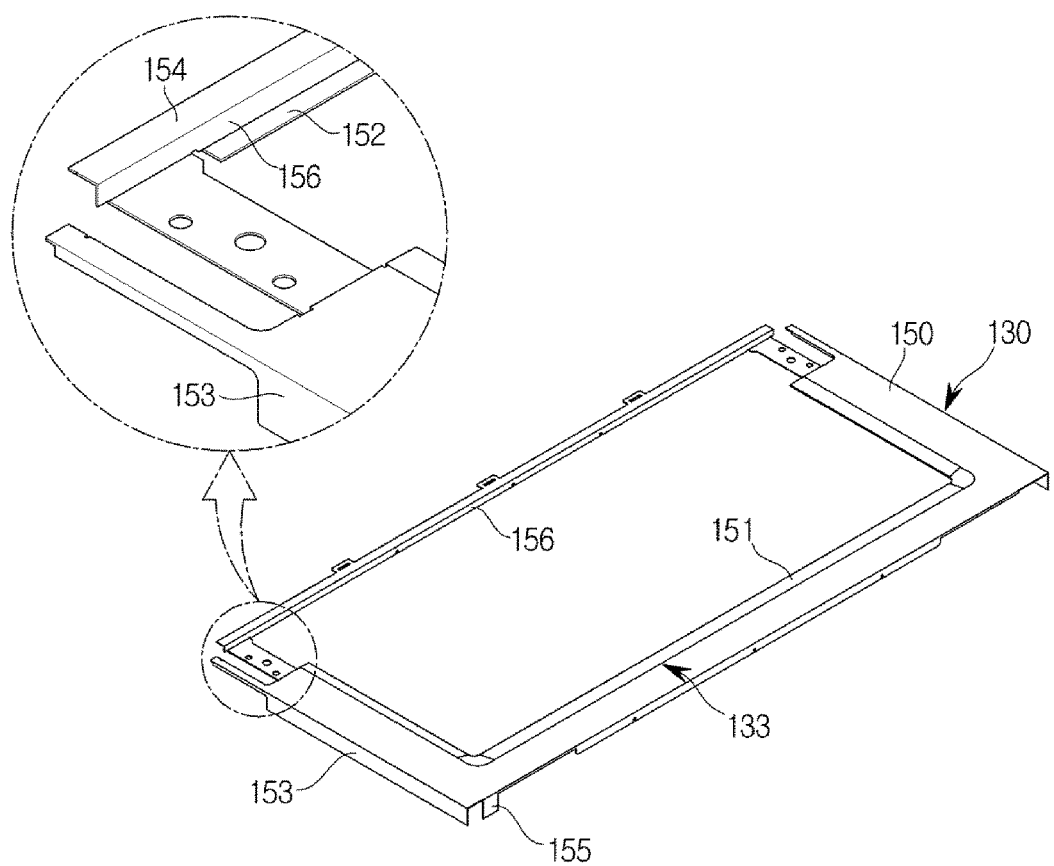

Next, referring to FIG. 19, a fifth bending portion 156 of the panel 130 may be bent with respect to the first portion 150 so as to face one side. In detail, the fifth bending portion 156 may be bent to have an angle of approximately 90° with respect to the first portion 150.

Figure 20:
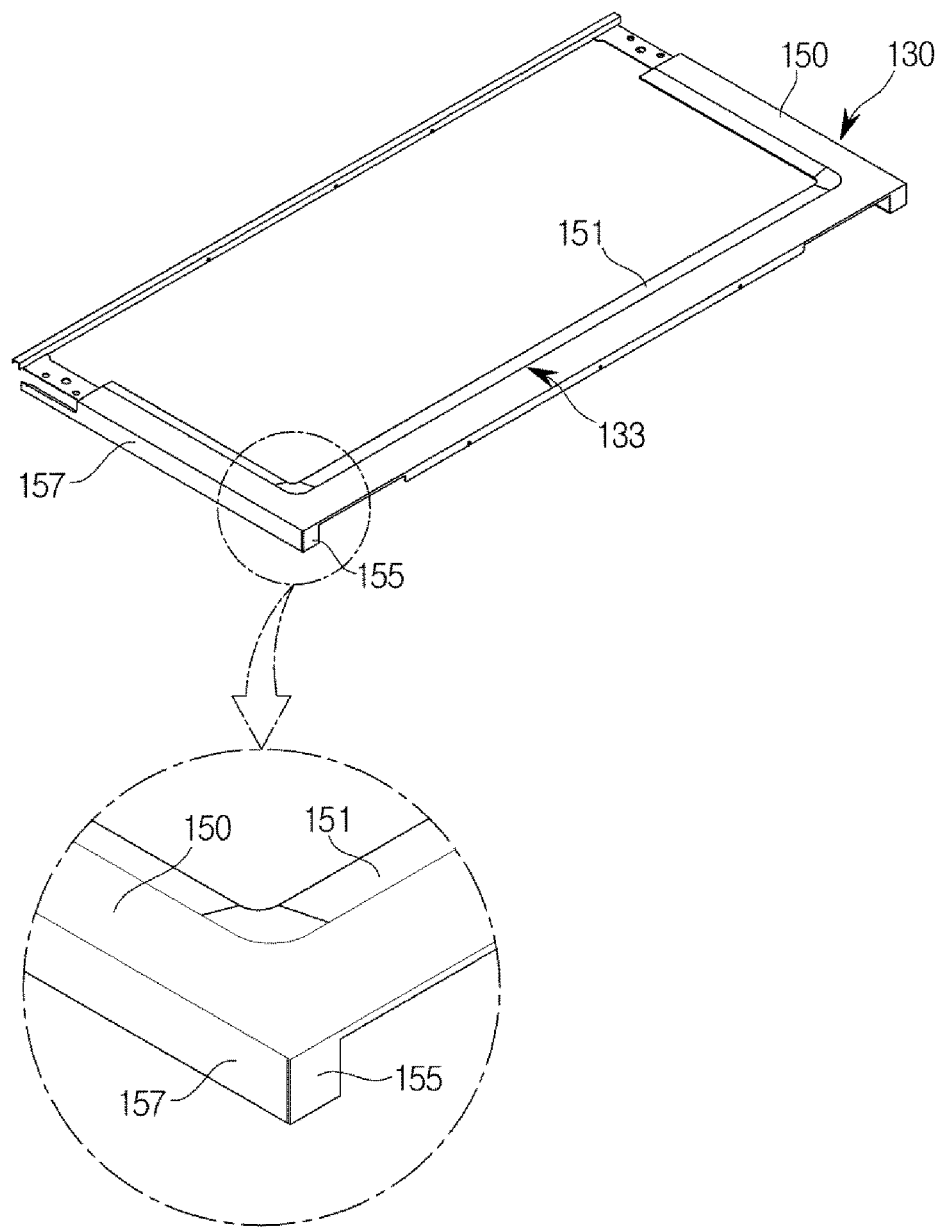

Next, referring to FIG. 20, a sixth bending portion 157 of the panel 130 may be bent with respect to the first portion 150 so as to face the other side. In detail, the sixth bending portion 157 may be bent to have an angle of approximately 90° with respect to the first portion 150. Thus, the position of the second bending portion 153 may be changed together with the sixth bending portion 157. That is, the second bending portion 153 and the sixth bending portion 157 may be disposed to cross the fourth bending portion 155.

Figure 21:
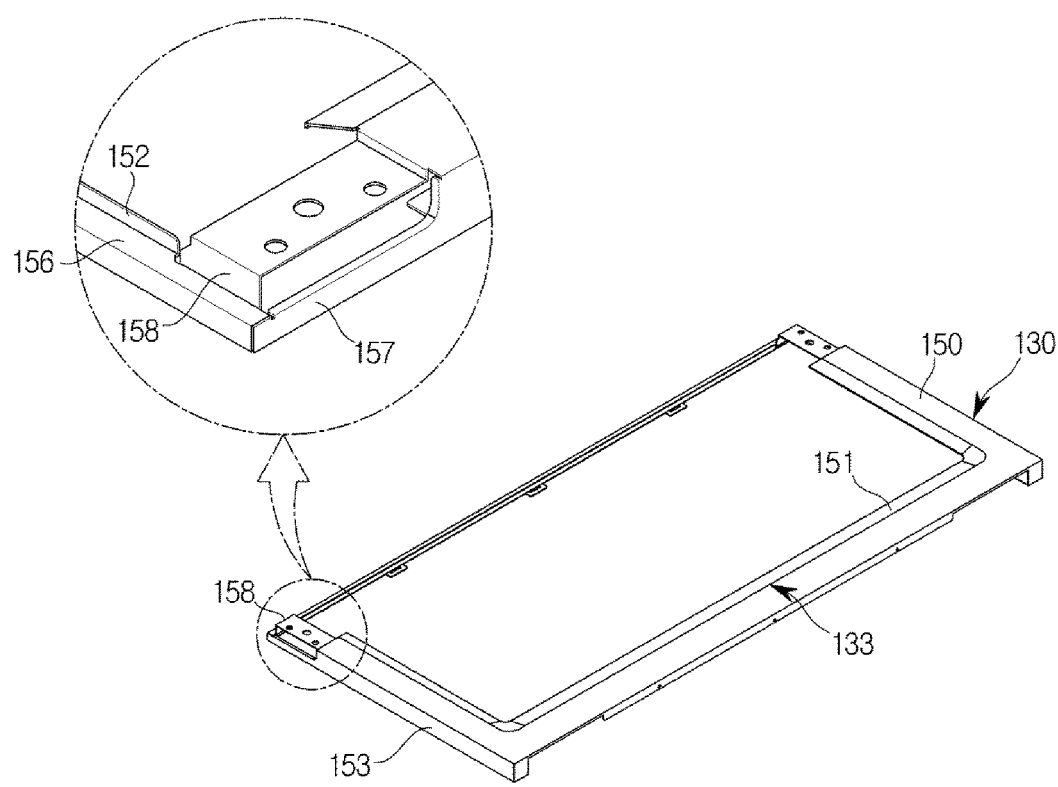
Figure 22:
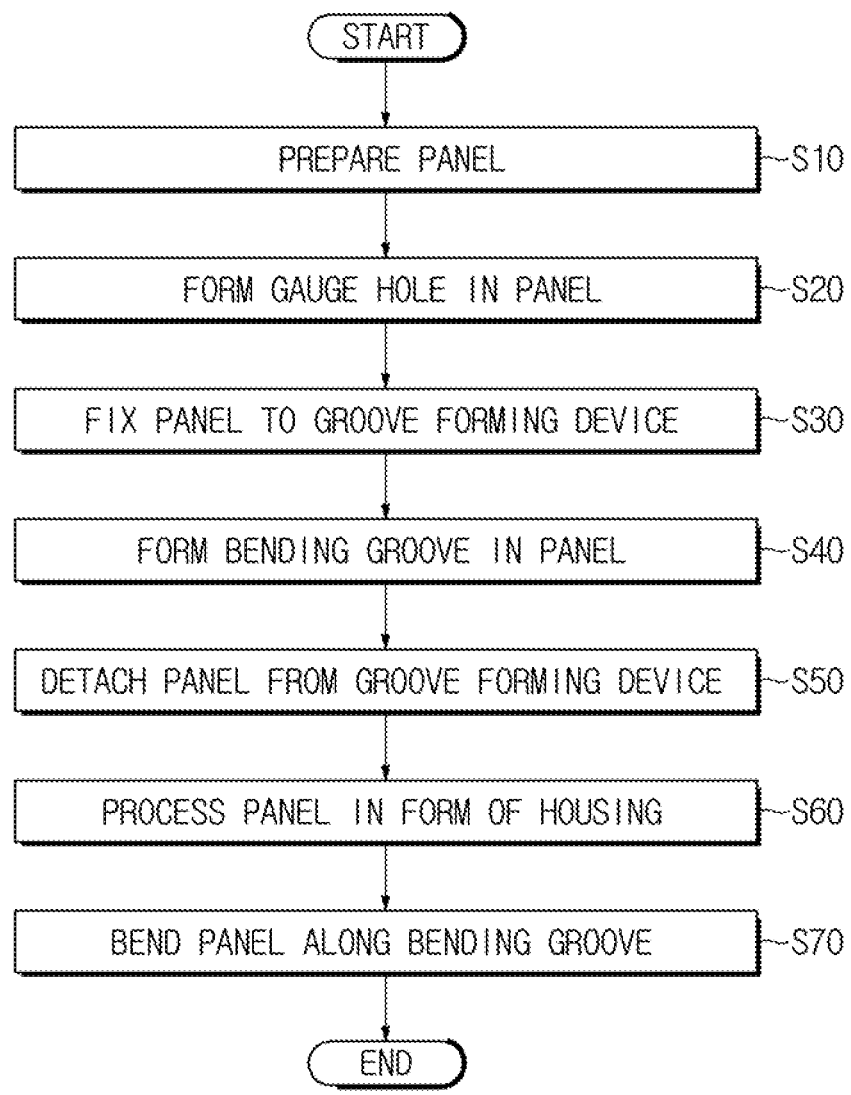
FIG. 22 is a flowchart illustrating a process of manufacturing a housing of a cooking appliance according to an embodiment of the present disclosure.

Next, referring to FIG. 21, a seventh bending portion 158 of the panel 130 may be bent with respect to the first portion 150 so as to face the other side. In detail, the seventh bending portion 158 may be bent to have an angle of approximately 90° with respect to the first portion 150. Thus, positions of the first bending portion 152 and the fifth bending portion 156 may be changed together with the seventh bending portion 158. That is, the fifth bending portion 156 may be disposed to cross the sixth bending portion 157.

The housing 100 manufactured by such as manufacturing process may be applied to the above-described door 110. In detail, the first portion 122 of the front door frame 120 may correspond to the first portion 150 of the panel 130, and the second portion 123 of the front door frame 120 may correspond to the second portion 151 of the panel 130, and the bending portion 121 of the front door frame 120 may correspond to the bending portion 133 of the panel 130, and the bending groove 126 of the front door frame 120 may correspond to the bending groove 132 of the panel 130.

The housing 100 manufactured by the above-described manufacturing process may form edges of the bending portions 121 and 133 sharply so that a design of the exterior of the housing 100 can be made beautiful.

According to the concept of the present disclosure, in a cooking appliance, a bending groove is formed in a bending portion of a housing so that the bending portion can be sharply formed.

According to the concept of the present disclosure, in the cooking appliance, a bending groove is formed in a curve section of a bending portion of a housing so that the curve section of the bending portion can be sharply formed.

According to the concept of the present disclosure, in a method of manufacturing a housing of a cooking appliance, a bending groove can be formed even in a curve section of a bending portion of the housing so that the bending portion can be sharply formed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A home appliance comprising:
    a housing comprising a door; and
    a chamber provided inside the housing,
    wherein the door includes, a front frame having a bending portion which is formed in the front frame, the bending portion having a bending angle and a bending groove inside of the bending portion,
    wherein the bending portion includes a linear bending portion that is bent in an approximately linear shape, and a curved bending portion that is bent in a curve shape with a predetermined curvature, and
    wherein the bending groove includes a first groove portion and a second groove portion, the first groove portion is formed to have an approximately linear shape, the second groove portion is formed to have a curve shape, wherein the second groove portion is formed to correspond to the curve shape with the predetermined curvature of the curved bending portion of the bending portion.

2. The home appliance of claim 1, wherein the bending groove is formed so that an initial inner angle of the bending groove is about 120° before the bending portion is bent.

3. The home appliance of claim 1, wherein the bending angle comprises a right angle or an obtuse angle.

4. The home appliance of claim 1, wherein the bending groove has a V-shape.

5. The home appliance of claim 1, wherein the bending groove has an asymmetric shape.

6. The home appliance of claim 1, wherein the bending portion is formed so that a thickness of the thinnest portion of the bending portion is between about 0.3 mm and about 0.35 mm.

7. The home appliance of claim 1, wherein the front frame comprises:
    a first portion, which extends from one end of the bending portion; and
    a second portion, which extends from an other end of the bending portion,
    wherein the first portion or the second portion comprises a curved surface portion.

8. A method of manufacturing a front frame of a door of a home appliance, the method comprising:
    fixing the front frame to a groove forming device;
    forming a bending groove that extends from one surface in a bending direction of the front frame and has an initial inner angle,
    wherein the forming of the bending groove includes cutting the front frame by rotating a cutting tool; and
    bending the cut front frame by a bending angle along the bending groove so that the bending groove is placed at an inside of the cut front frame,
    wherein in the forming of the bending groove, the bending groove is formed to include an approximately linear section and a curve section, the curve section formed to correspond to an exterior edge of the bended cut front frame.

9. The method of claim 8, wherein, in the forming of the bending groove, the bending groove is formed by a computer numerical control (CNC) processing method.

10. The method of claim 8, wherein, in the forming of the bending groove, the bending groove is formed so that a cross-section of the bending groove has a V-shape.

11. The method of claim 8, wherein, in the forming of the bending groove, the bending groove is formed so that a cross-section of the bending groove has an asymmetric shape.

12. The method of claim 8, wherein, in the forming of the bending groove, the bending groove is formed so that an initial inner angle thereof satisfies the following equation:

$$(180°-\text{the bending angle}) \leq \text{an initial inner angle of the bending groove} \leq 150°.$$

13. The method of claim 8, wherein, in the forming of the bending groove, the bending groove is formed so that a thickness of a thinnest portion of the bending groove satisfies the following equation:

$$0.25 \leq (\text{a thickness of a thinnest portion of the bending groove}/\text{a thickness of the front frame}) \leq 0.5.$$

14. The method of claim 8, wherein, in the bending of the front frame, the bending angle comprises a right angle or an obtuse angle.

15. The method of claim 8, further comprising, before the fixing of the front frame, forming a gauge hole in the front frame.

16. The method of claim 15, wherein the fixing of the front frame comprises fixing the front frame in the groove forming device by fixing the gauge hole to a fixing protrusion formed in the groove forming device.

17. The method of claim 8, further comprising, between the forming of the bending groove and the bending of the front frame, processing the front frame in a form of the door by a press processing.

18. The home appliance of claim 1, wherein a ratio of a thickness of a thinnest portion of the bending groove to a thickness of the front frame, is greater than or equal to 0.25 and less than or equal to 0.5.

* * * * *